United States Patent
Endoh et al.

(10) Patent No.: US 8,329,132 B2
(45) Date of Patent: Dec. 11, 2012

(54) POLYCRYSTALLINE SILICON MANUFACTURING APPARATUS AND MANUFACTURING METHOD

(75) Inventors: Toshihide Endoh, Suzuka (JP);
Masayuki Tebakari, Saitama (JP);
Toshiyuki Ishii, Yokkaichi (JP);
Masaaki Sakaguchi, Suzuka (JP);
Naoki Hatakeyama, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 787 days.

(21) Appl. No.: 12/292,602

(22) Filed: Nov. 21, 2008

(65) Prior Publication Data

US 2009/0136408 A1    May 28, 2009

(30) Foreign Application Priority Data

Nov. 28, 2007   (JP) .................... 2007-307444

(51) Int. Cl.
*C01B 33/02*     (2006.01)
(52) U.S. Cl. .................. 423/348; 118/715; 118/733
(58) Field of Classification Search .......... 423/348–350; 422/350; 117/715–733
See application file for complete search history.

(56) References Cited

U.S. PATENT DOCUMENTS

| | | | |
|---|---|---|---|
| 3,980,042 A | 9/1976 | Stut | |
| 4,150,168 A | 4/1979 | Yatsurugi et al. | |
| 4,444,812 A * | 4/1984 | Gutsche | 427/255.17 |

FOREIGN PATENT DOCUMENTS

| | | | |
|---|---|---|---|
| EP | 2039653 A2 | 3/2009 | |
| EP | 2075233 A2 | 7/2009 | |
| JP | 60-016898 A | 1/1985 | |
| JP | 61-281009 | 12/1986 | |
| JP | 2867306 | 6/1993 | |
| JP | 2867306 | * 8/1993 | |
| JP | 3345929 | 6/1994 | |
| JP | 06172093 A | * 6/1994 | |
| JP | 2003-128492 A | 5/2003 | |
| JP | 2009-073683 A | 4/2009 | |

OTHER PUBLICATIONS

Machine translation of JP06172093.*
European Search Report dated Jan. 27, 2011, issued for the corresponding European Patent Application No. 08169890.4.
Office Action issued May 14, 2012 for corresponding Russian Application No. 2008146558 and translation thereof.

* cited by examiner

*Primary Examiner* — Stuart Hendrickson
*Assistant Examiner* — Richard M Rump
(74) *Attorney, Agent, or Firm* — Edwards Wildman Palmer LLP

(57) ABSTRACT

A polycrystalline silicon manufacturing apparatus efficiently produces high-quality polycrystalline silicon. There is provided a polycrystalline silicon manufacturing apparatus, in which a plurality of gas supplying ports 6A for ejecting raw gas upward in a reactor 1 and gas exhausting ports 7 for exhausting exhaust gas after a reaction are provided on an inner bottom of the reactor 1 in which a plurality of silicon seed rods 4 are stood, the silicon seed rods 4 are heated and the polycrystalline silicon is deposited from the raw gas on the surfaces. The apparatus includes gas distributing tubes 9 that are respectively connected to the gas supplying ports 6A and respectively supply the raw gas to the gas supplying ports 6A, valves 21 that are provided on at least the gas distributing tubes connected to the gas supplying ports 6A adjacent to a center of the reactor 1 and open or close conduit lines of the gas distributing tubes 9, and a valve controlling device 22 that is connected to the valves 21 and controls the conduit lines to be closed for a predetermined time at an early stage of the reaction.

13 Claims, 5 Drawing Sheets

POLYCRYSTALLINE SILICON MANUFACTURING APPARATUS AND MANUFACTURING METHOD

BACKGROUND OF THE INVENTION

1. Field of the Invention

The present invention relates to a polycrystalline silicon manufacturing apparatus and manufacturing method that deposits polycrystalline silicon on a surface of a heated silicon seed rod to manufacture a polycrystalline silicon rod.

Priority is claimed on Japanese Patent Application No. 2007-307444, filed Nov. 28, 2007, the content of which is incorporated herein by reference.

2. Description of Related Art

A manufacturing apparatus by Siemens method has been known as this kind of polycrystalline silicon manufacturing apparatus. This polycrystalline silicon manufacturing apparatus has a configuration for providing a large number of silicon seed rods in a reactor to heat the seeds, supplying raw gas consisting of mixed gas of chlorosilane gas and hydrogen gas to this reactor, and depositing polycrystalline silicon by contacting the raw gas with the heated silicon seed rods.

In such a polycrystalline silicon manufacturing apparatus, the silicon seed rods are fixed on electrodes provided on the inner bottom of the reactor in the standing state, and the upper ends of the seed rods are coupled by short-length connection members while forming a pair in order to form the π character shape. Moreover, a plurality of supply ports for the raw gas are provided on the inner bottom of the reactor, and is arranged to be dispersed among the large number of standing silicon seed rods. Then, in the polycrystalline silicon manufacturing apparatus, electricity is conducted from the electrodes to the silicon seed rods, the silicon seed rods are heated by resistance of the silicon seed rods and the raw gas ejected from the lower side is contacted with the surfaces of the silicon seed rods to deposit the polycrystalline silicon.

However, when the number of the silicon seed rods are densely increased, there is a problem that it becomes difficult to stably supply the raw gas to each surface of the silicon seed rods, the silicon seed rods swing and fall down due to a turbulent flow of the raw gas, and so on. The reason is that condition of upward flow, concentration, or the like of the raw gas becomes unstable particularly in the upper portions of the silicon seed rods due to the interference of the upward flow of the raw gas and the downward flow of exhaust gas because exhaust ports for exhaust gas after a reaction and the supply ports are generally provided on the inner bottom of the reactor.

Therefore, for example, Japanese Patent No. 2867306 discloses a nozzle for supplying raw gas that has a two-staged structure consisting of an upper nozzle for supplying raw gas toward the upper portions of the silicon seed rods and a lower nozzle for supplying raw gas toward the lower portions of the silicon seed rods and sufficiently supplies the raw gas to the upper portions of the silicon seed rods. Alternatively, Japanese Patent No. 3345929 discloses an apparatus that arranges the exhaust ports for exhaust gas in the upper portion of the reactor rather than the inner bottom of the reactor and exhausts the exhaust gas without interfering with the upward flow of the raw gas.

In this manner, although there has been performed the invention in which the gas flow in the reactor is preserved in an appropriate state to manufacture the polycrystalline silicon, it is desired that further high control for gas flow is demanded and high-quality polycrystalline silicon is produced more efficiently with increases in the size of the reactor and in the density of the silicon seed rods.

SUMMARY OF THE INVENTION

The present invention has been achieved in view of the situation above, and the object is to provide a polycrystalline silicon manufacturing apparatus and manufacturing method that can efficiently produce high-quality polycrystalline silicon.

There is provided a polycrystalline silicon manufacturing apparatus of the present invention, in which a plurality of gas supplying ports for ejecting raw gas upward in a reactor and gas exhausting ports for exhausting exhaust gas after a reaction are provided on an inner bottom of the reactor in which a plurality of silicon seed rods are stood, the silicon seed rods are heated and the polycrystalline silicon is deposited from the raw gas on surfaces of the silicon seed rods. The polycrystalline silicon manufacturing apparatus includes gas distributing tubes that are respectively connected to the gas supplying ports and respectively supply the raw gas to the gas supplying ports, valves that are provided on at least the gas distributing tubes connected to the gas supplying ports adjacent to a center of the reactor and open or close conduit lines of the gas distributing tubes, and a valve controlling device that is connected to the valves and controls the conduit lines to be closed for a predetermined time at an early stage of the reaction.

In the polycrystalline silicon manufacturing apparatus, the raw gas is ejected from the gas supplying ports upward, the upward gas flow comes in contact with the silicon seed rods to deposit the polycrystalline silicon on the surfaces of the silicon seed rods, and the gas after being supplied to deposit the silicon reaches to the ceiling of the reactor and then runs down to the lower side to be exhausted from the gas exhausting ports. At this time, most of the raw gas colliding with the ceiling of the reactor flows toward the outside along the inner circumferential face of the reactor, but in the central portion of the reactor, the flow colliding with the ceiling is reversed without flowing toward the outside to be the downward gas flow, so as to easily cause the downward gas flow to interfere with the upward gas flow rising from the lower side. In particular, since the gas flow adjacent to the center in the reactor is easy to be reversed from the ceiling as it is, there is a tendency that the interference between the gas flows easily occurs. When the interference between the gas flows occurs, the silicon seed rods standing in the reactor swing because the flow direction of the gas becomes unstable. Since the diameter of silicon rods at an early reaction stage is extremely small as 10 to 20 mm, large swing of the silicon seed rods may result in the breakage of the silicon seed rods.

Therefore, since the valves that are provided on the gas distributing tubes of the gas supplying ports in the adjacent of the center are closed for a predetermined time in order to stop the gas flow from the lower side, the state in which the downward gas flow from the ceiling easily reaches to the inner bottom in the reactor can be guaranteed. Since the posture of the silicon seed rods after the polycrystalline silicon is sufficiently deposited thereon is stable, this control of the valves is performed at an early step of the reaction. Then, the opening or closing of these valves is appropriately controlled in order to prevent the interference between the upward gas flow and the downward gas flow, and the silicon can be grown in the state where gas flow along the periphery of the silicon seed rods is stable. After the growth of the silicon is stabilized, the control may be stopped.

In the polycrystalline silicon manufacturing apparatus, the gas supplying ports may be concentrically arranged from the center of the reactor.

In this case, the valve controlling device selects the gas supplying ports corresponding to 5 to 15% of the total number of the gas supplying ports from among the gas supplying ports placed on a most inner circumference and a second circumference from the most inner circumference to control the valves of the gas distributing tubes connected to the selected gas supplying ports to be closed for a predetermined time, and after the predetermined time is passed, selects the same pieces of the gas supplying ports from among the gas supplying ports, which are under the opened state, placed on the most inner circumference and the second circumference from the most inner circumference to control the valves of the gas distributing tubes connected to the selected gas supplying ports to be in the closed state and also controls the valves in the closed state to be opened. In the method for selecting the gas supplying ports, it is desirable that the gas supplying ports to be closed are selected so that both of two adjacent gas supplying ports on the same circumference are not closed. Then, after the valves of the selected gas supplying ports are closed for a predetermined time, the other gas supplying ports are selected, the opening and closing for the valves of the gas supplying ports are switched, the valves of the selected gas supplying ports are similarly closed for a predetermined time, and these operations are repeated. Since this switching between opening and closing of the valves is performed by an automatic computer control, the downward gas flow can be led to the space above the gas supplying ports having the closed valves while the raw gas is supplied to the silicon seed rods by a proper time, and thus the silicon can be appropriately deposited to stabilize the growth of the silicon.

Moreover, in the polycrystalline silicon manufacturing apparatus of the present invention, the gas supplying ports may be provided on tips of nozzles protruded from the inner bottom of the reactor.

In the polycrystalline silicon manufacturing apparatus, since the gas supplying ports are arranged at a position upper than the inner bottom of the reactor, a space where the gas is not ejected is formed between the inner bottom of the reactor and the gas supplying ports. Therefore, the falling exhaust gas flows horizontally through the space and is led to the gas exhausting ports. As a result, the upward flow of the raw gas is not disturbed by the horizontally directional flow as well as the downward flow of the exhaust gas, and the raw gas can be very stably supplied along the silicon seed rods.

Then, there is provided a polycrystalline silicon manufacturing method of the present invention, in which a plurality of gas supplying ports for ejecting raw gas upward in a reactor and gas exhausting ports for exhausting exhaust gas after a reaction are provided on an inner bottom of the reactor in which a plurality of silicon seed rods are stood, the silicon seed rods are heated and polycrystalline silicon is deposited from the raw gas on surfaces of the silicon seed rods. The polycrystalline silicon manufacturing method includes stopping ejecting the raw gas from at least the gas supplying ports adjacent to a center of the reactor for a predetermined time at an early stage of the reaction.

Moreover, in this case, the gas supplying ports are concentrically arranged from the center of the reactor, the method includes selecting the gas supplying ports corresponding to 5 to 15% of the total number of the gas supplying ports from among the gas supplying ports placed on a most inner circumference and a second circumference from the most inner circumference to stop ejecting the raw gas from the selected gas supplying ports for a predetermined time, and after the predetermined time is passed, selecting the same pieces of the gas supplying ports from among the gas supplying ports, which ejects the raw gas, placed on the most inner circumference and the second circumference from the most inner circumference to stop ejecting the raw gas from the selected gas supplying ports and also ejecting the raw gas from the gas supplying ports that has stopped ejecting the raw gas.

According to the present invention, since the valves that are provided on the gas distributing tubes of the gas supplying ports in the adjacent of the center of the reactor are closed to stop the gas flow from the lower side at an early stage of the reaction, the state where the downward gas flow easily reaches to the inner bottom in the reactor can be guaranteed. Since the opening or closing of the valves is appropriately controlled to prevent interference between the upward gas flow and the downward gas flow, the silicon can be grown in the state where the gas flow along the periphery of the silicon seed rods is stable and thus high-quality silicon can be manufactured. Moreover, an existing manufacturing apparatus can be applied without changing the scale by only controlling the supply device for raw gas.

DETAILED DESCRIPTION OF THE INVENTION

Hereinafter, an embodiment for a polycrystalline silicon manufacturing apparatus and manufacturing method according to the present invention will be described with reference to the accompanied drawings.

Figure 1:
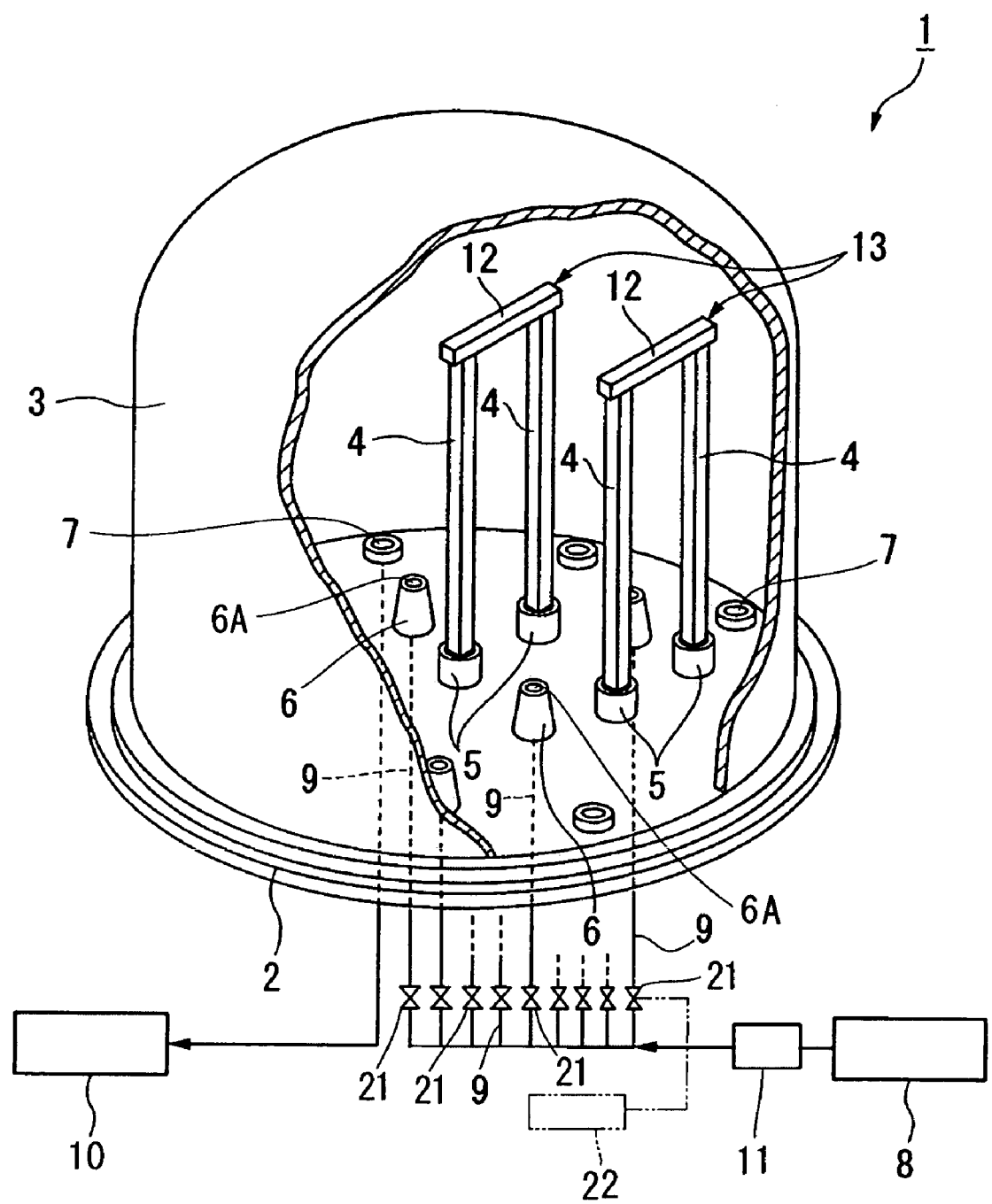
FIG. 1 is a perspective diagram illustrating the state where a bell-jar of a reactor is partially cut.

FIG. 1 is an overall diagram illustrating a polycrystalline silicon manufacturing apparatus of the present invention, and a reactor 1 in the polycrystalline silicon manufacturing apparatus includes a bottom plate 2 constituting a furnace bottom and a bell-shaped bell-jar 3 detachably attached on the bottom plate 2.

As illustrated in FIG. 1, on the bottom plate 2, there are provided plural pairs of electrodes 5 on which silicon seed rods 4 becoming seed bars of polycrystalline silicon to be deposited are attached, a plurality of ejecting nozzles 6 for ejecting raw gas including chlorosilane gas and hydrogen gas into the furnace, and a plurality of gas exhausting ports 7 for exhausting gas after a reaction to the outside of the furnace.

Moreover, the plurality of ejecting nozzles 6 for the raw gas is concentrically dispersed across approximately the whole area covering the upper surface of the bottom plate 2 in the reactor 1 while leaving proper intervals between the nozzles so that the raw gas can be uniformly supplied to the silicon seed rods 4. The ejecting nozzles 6 are respectively connected to a raw gas supplying source 8 outside the reactor 1 via gas distributing tubes 9. Moreover, the plurality of gas exhausting ports 7 is provided on the bottom plate 2 while leaving proper intervals therebetween, and is connected to an exhaust gas processing system 10. In the present drawing, the reference number 11 illustrates a raw gas controlling device for controlling pressure and flow volume for the overall raw gas supplied from the raw gas supplying source 8.

Figure 3:
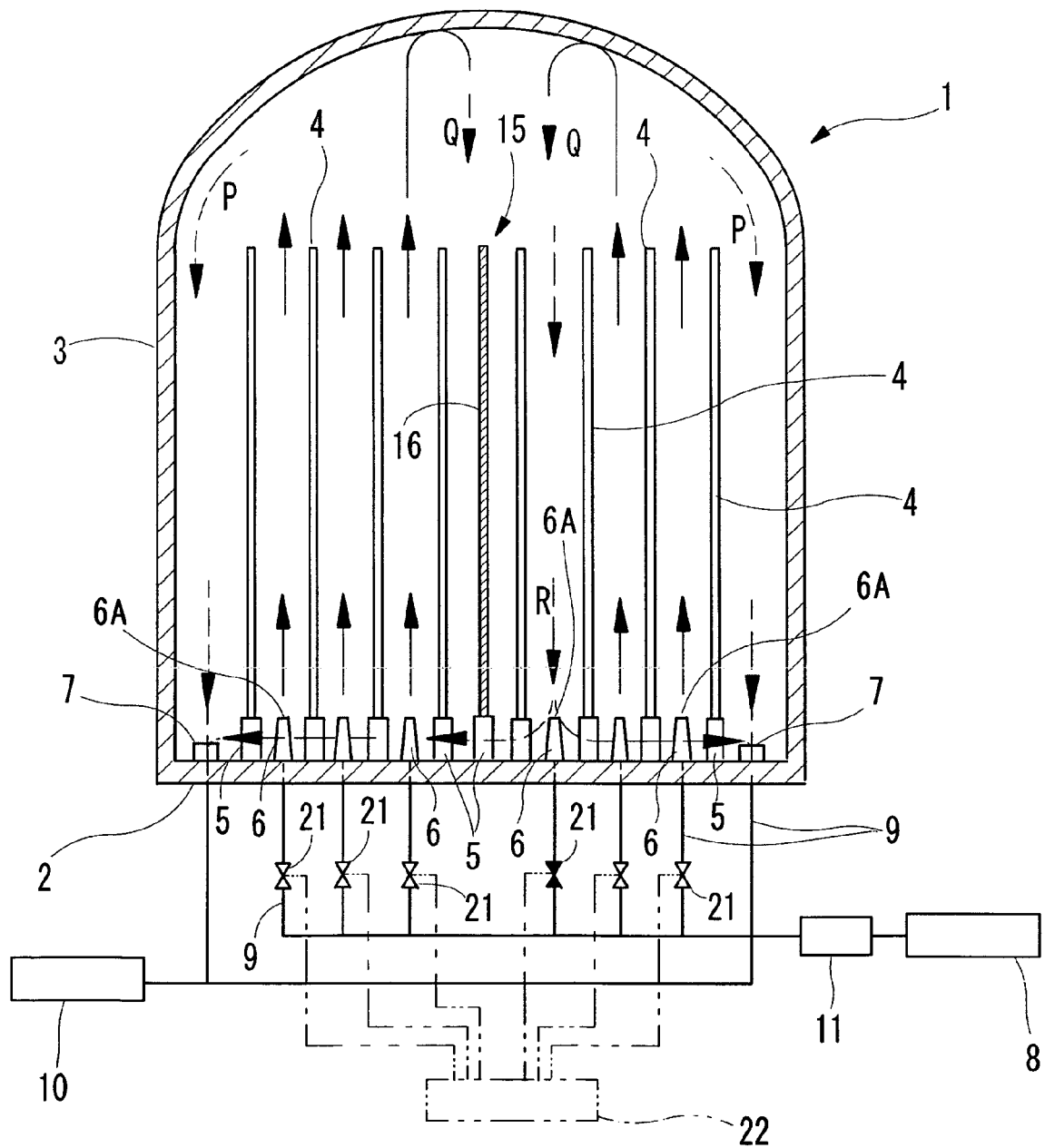
FIG. 3 is a vertical cross-sectional diagram of the reactor illustrated in FIG. 1.

In this case, as illustrated in FIG. 3, the ejecting nozzles 6 are provided to be protruded from the upper surface (the inner bottom face of the reactor 1) of the bottom plate 2, and thus gas supplying ports 6A on the tips of the ejecting nozzles 6 are arranged at positions departed from the upper surface of the bottom plate 2 at a predetermined height. On the other hand, the gas exhausting ports 7 are arranged at positions lower than the height of the gas supplying ports 6A of the ejecting nozzles 6.

Each of the electrodes 5 consists of approximately cylindrical carbon, is approximately concentrically arranged on the bottom plate 2 at a predetermined interval, is vertically stood on each bottom plate 2, and makes holes (not illustrated) formed along the centers of the axes. The lower ends of the silicon seed rods 4 are attached to the insides of the holes to be inserted therein. In the example illustrated in FIG. 3, the height of the electrodes 5 and the height of the ejecting nozzles 6 are set to be substantially the same.

Moreover, the silicon seed rods 4 are fixed in the state in which the lower ends are inserted into the insides of the electrodes 5 in order to be stood upward as illustrated in FIG. 1 and FIG. 3, and each short-length connection member 12 is attached to the upper ends of two silicon seed rods so as to connect each pair of the silicon seed rods. The connection member 12 is made of same silicon as the silicon seed rods 4. Seed assembling bodies 13 are assembled of the two silicon seed rods 4 and the connection member 12 connecting these silicon seed rods 4 to make the $\pi$ character shaped as a whole.

Figure 2:
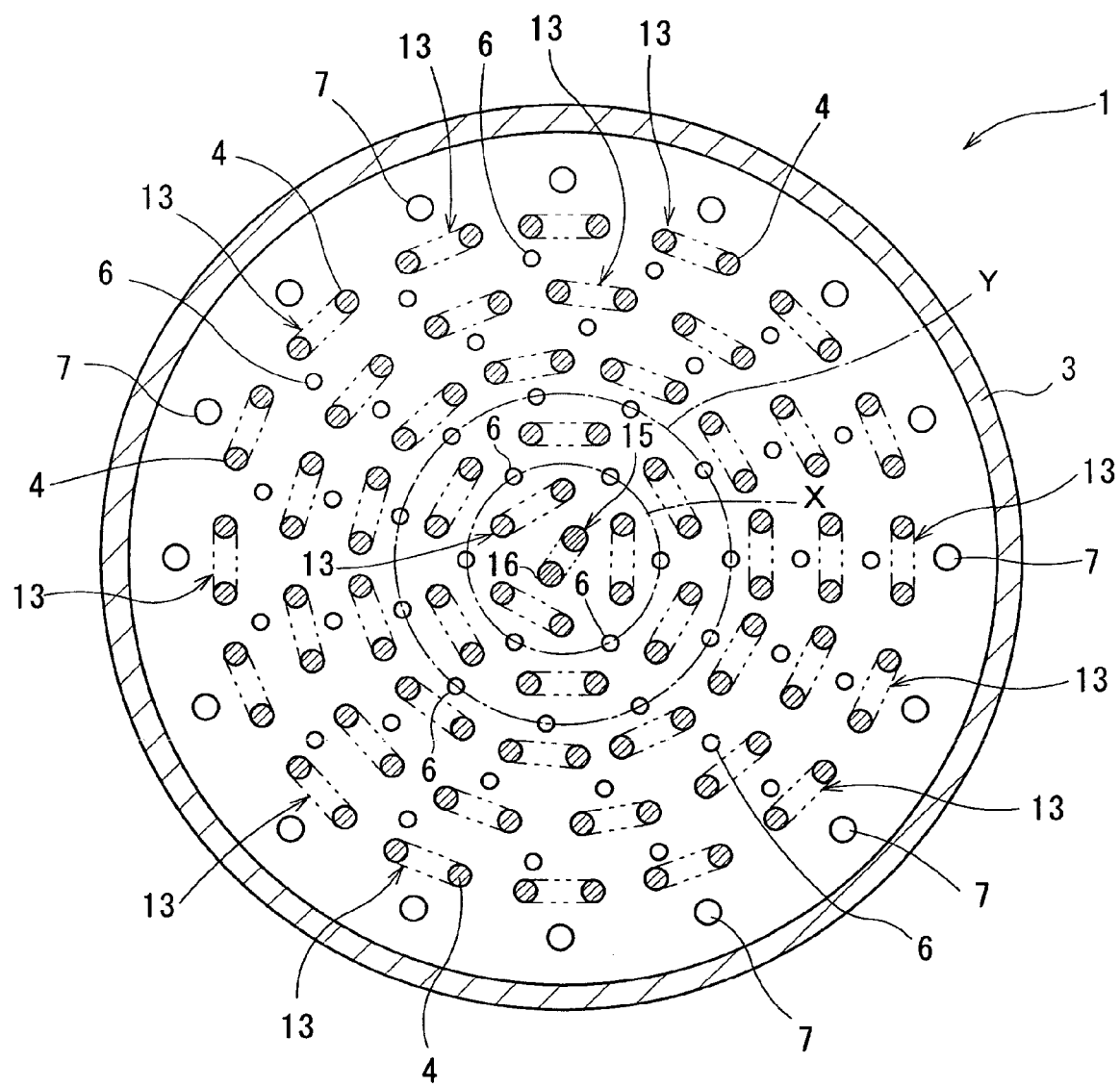
FIG. 2 is a horizontal cross-sectional diagram of the reactor illustrated in FIG. 1.

As illustrated in FIG. 2, although the electrodes 5 are concentrically arranged from the center of the reactor 1, all of the seed assembling bodies 13 may not be necessarily concentric arrangement, or the silicon seed rods 4 of a part of the seed assembling bodies 13 may be arranged in the radial direction or the like.

Moreover, as illustrated in FIGS. 2 and 3 and not illustrated in FIG. 1, a heating apparatus 15 is provided in the center of the reactor 1. The heating apparatus 15 in this embodiment has a configuration in which a bar-typed carbon heater 16 is stood in the shape of the $\pi$ character on the electrodes 5 on the bottom plate 2, and is set to a height corresponding to the overall length of the silicon seed rods 4 so that radiant heat can be irradiated over the overall length of the silicon seed rods 4. Moreover, valves 21 for opening or closing internal conduit lines are provided in the gas distributing tubes 9, and a valve controlling device 22 for controlling the opening or closing is connected to the valves 21. The valve controlling device 22 opens or closes each valve 21 to control the ejection of raw gas.

In the polycrystalline silicon manufacturing apparatus configured in this manner, the heating apparatus 15 arranged in the center of the reactor 1 and the electrodes 5 connected to the silicon seed rods 4 are conducted with electricity, and thus these heating apparatus 15 and silicon seed rods 4 generate heat. At this time, the heating apparatus 15 generates heat and increases its temperature earlier than the silicon seed rods 4 because the heating apparatus 15 is the carbon heater 16, and the radiant heat from this carbon heater 16 is conducted to the silicon seed rods 4 placed on the most inner circumferential position to heat the silicon seed rods 4. When the temperature of the silicon seed rods 4 is increased until electricity can be conducted through the seed rods, the silicon seed rods 4 become a resistance heat generating state by being applied electricity from their own electrodes 5, the heat is transmitted to the silicon seed rods 4 adjacent to the seed rods generating heat, the adjacent silicon seed rods 4 are heated, the heat transfer phenomenon is propagated in turn in the radial direction of the reactor 1 or the like, and the all of silicon seed rods 4 in the reactor 1 are finally conducted with electricity and become the heat generating state. Since these silicon seed rods 4 are heated up to decomposition temperature of raw gas, the raw gas ejected from the ejecting nozzles 6 reacts on the surfaces of the silicon seed rods 4 to deposit polycrystalline silicon.

Then, at the early operating step, the ejecting nozzles corresponding to preferably 5% to 15% from among the number of all the ejecting nozzles are selected in the ejecting nozzles 6 located on at least the most inner circumference X and the second inner circumference Y, and the valves 21 of the gas distributing tubes 9 connected to the selected ejecting nozzles 6 are controlled to be closed. In the method for selecting the ejecting nozzles 6, it is desirable that the gas supplying ports 6A to be closed are selected so that both of two adjacent ejecting nozzles on the same circumference are not closed.

Moreover, after a predetermined time is passed, the same number of the ejecting nozzles as the number of the closed ejecting nozzles are selected from the opened ejecting nozzles on the basis of the selection method based on the above method, and the valves 21 connected to the selected ejecting nozzles are closed. At the same time, the valves 21 that have been closed until now are opened. Here, it is desirable that the predetermined time is not less than 10 minutes and not more than 60 minutes. Since the ejecting nozzles 6 are switched before the gas flow in the furnace is stabilized in case of less than 10 minutes, the flow in the furnace is not stabilized. Moreover, since the opening and closing frequency of the valves is increased, it is concerned that the life expectancy of the valves is shortened. In case of more than 60 minutes, since sufficient raw gas is not supplied to the surfaces of the silicon seed rods 4 in the adjacent of the ejecting nozzles connected to the closed valves, there is a problem that a negative effect is wielded on crystal growth speed or formation of good surface shapes, and so on. In addition, it is desirable that the early operating step will be performed during about one day after starting the operation.

When the raw gas is ejected from the gas supplying ports 6A of the ejecting nozzles 6, the gas flow rises along the silicon seed rods 4 as illustrated with the arrows of the solid line in FIG. 3, and polycrystalline silicon is meanwhile deposited on the surfaces of the silicon seed rods 4. Then, after the rising gas flow collides with the ceiling of the bell-jar 3, most of the gas flows in a radial direction along the inner circumferential face of the bell-jar 3 as illustrated with the arrow P of the dashed line, and the gas is exhausted to the outside from the gas exhausting ports 7 arranged on an outer circumferential portion of the bottom plate 2. Moreover, although the gas flow that collides with the ceiling and is reversed is going to come down as illustrated with the arrow Q, at this time, since the upward gas flow is not generated at the positions of the ejecting nozzles 6 having the closed valves 21 as described above, the downward gas flow is led to the positions and runs down to the surface of the bottom plate 2 as illustrated with the arrow R. The gas flow reaching the surface of the bottom plate 2 flows in a radial pattern toward the outside of the radius along the surface, and the gas is exhausted from the gas exhausting ports 7 on the outer circumferential portion.

In this way, since the ejection of the raw gas from a part of the ejecting nozzles 6 is stopped, a route for the downward gas flow after colliding with the ceiling of the bell-jar 3 is guaranteed and thus interference with the upward flow of the raw gas ejected from the other ejecting nozzles 6 does not occur.

Figure 4:
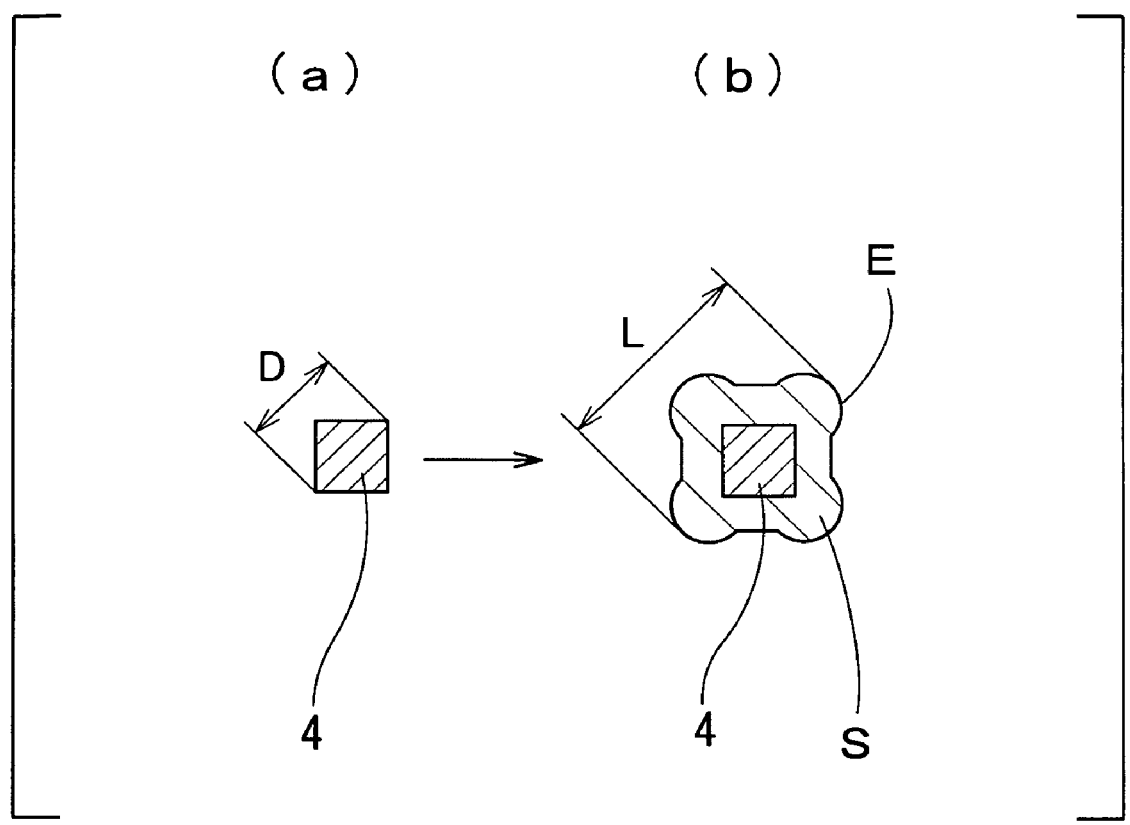
FIG. 4 is model diagrams illustrating a deposition condition of polycrystalline silicon to a silicon seed rod.

Since the swing or the like of the silicon seed rods 4 is suppressed when the amount of the polycrystalline silicon deposited on the surfaces of the silicon seed rods 4 increases after a predetermined time is passed while the opening or closing for the valves 21 is controlled, the silicon can be stably grown after that even though the control for the valves 21 is stopped. The standard for control termination at the early operating stage is a time at which the polycrystalline silicon S is deposited to about an opposite angle length L which is two to three times with respect to an opposite angle length D in the transverse section of the silicon seed rod 4 having a rectangular shape on the transverse section, as illustrated in the cross section of FIG. 4 (b) when a transverse section of the silicon seed rod 4 is formed in the shape of a rectangle as illustrated in FIG. 4 (a).

Figure 5A:
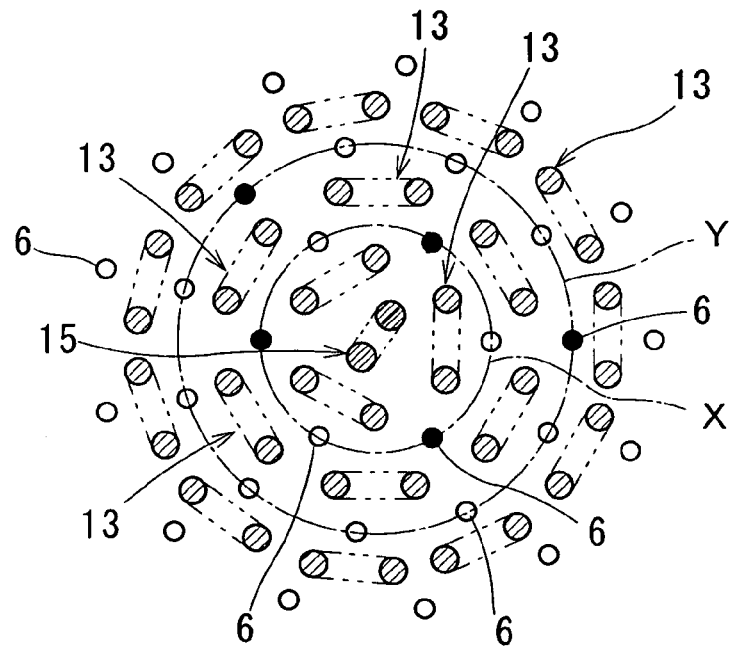
FIGS. 5A and 5B are cross-sectional diagrams adjacent to the center of the reactor illustrating an example of an opening or closing control for a valve of an ejecting nozzle.
Figure 5B:
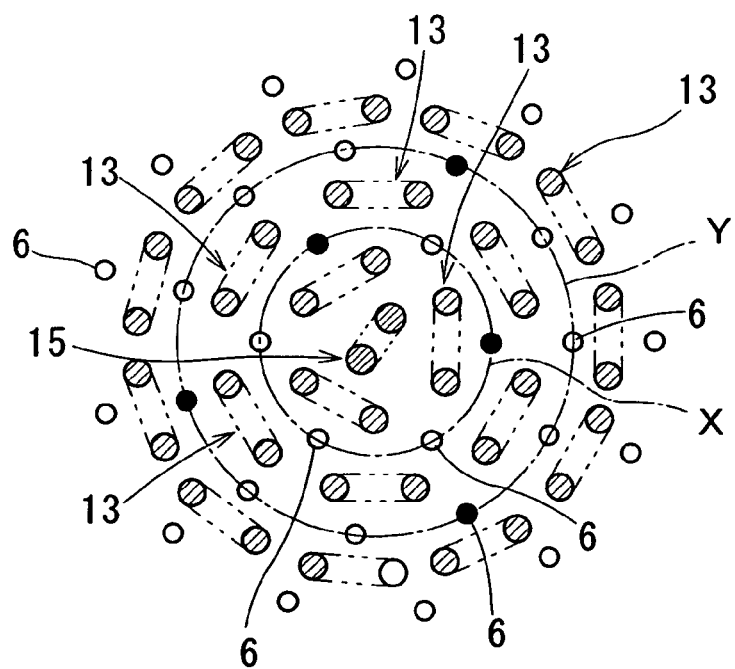

For confirming the above-described effect, the following control is performed by using the reactor having 45 gas supplying ports 6A. As illustrated with ● in FIG. 5A, 5 gas supplying ports 6A corresponding to about 11% of all of the 45 gas supplying ports 6A concentrically arranged are equally selected without bias from the gas supplying ports 6A placed on the most inner circumference X and the second inner circumference Y from the most inner circumference, and the valves 21 of the gas distributing tubes 9 connected to the selected gas supplying ports 6A are closed. In FIGS. 5A and 5B, the ejecting nozzles 6 having the opened valves 21 are illustrated with ○ and the ejecting nozzles 6 having the closed valves 21 are illustrated with ●. The state illustrated in FIG. 5A is held for 20 minutes, for example. After 20 minutes have passed, as illustrated by changing the locations of ● and ○ in FIG. 5B, 5 gas supplying ports 6A are selected from the opened gas supplying ports 6A placed on the most inner circumference X and the second inner circumference Y from the most inner circumference in FIG. 5A, and then the valves 21 of the gas distributing tubes 9 connected to the selected gas supplying ports 6A are closed and simultaneously the valves 21 closed until now are opened. This state is held for a predetermined time. This operation is repeated for 24 hours. When this control at the early operating stage is not performed, electricity is stopped and the reaction process is stopped because the upper portion of the silicon seed rod is damaged due to the interference of the raw gas at a frequency of about 10%. The reaction process can be continued without damaging the silicon seed rods by performing the control illustrated in the embodiment.

In addition, the present invention is not limited to the configuration in the embodiment, and may have a configuration in which a valve for collectively controlling the supply of the raw gas to a header tube for supplying the raw gas at the upper position of the gas distributing tube when the operation is started and terminated is provided separately from an individual valve. Moreover, the gas supplying ports 6A are arranged in four concentric circles in the example shown in FIG. 2, however, a number of concentric circles may be three or more. Furthermore, in connection with a detailed configuration, it is possible to add various kinds of modification within a range which does not depart from the purpose of the present invention.

What is claimed is:

1. A polycrystalline silicon manufacturing method comprising:
   heating a plurality of silicon seed rods standing in a bell shaped reactor;
   ejecting a raw gas upward in the bell shaped reactor from a plurality of gas supplying ports for ejecting raw gas so that polycrystalline silicon is deposited from the raw gas on the surfaces of the silicon seed rods; and
   exhausting exhaust gas after reaction from gas exhausting ports, provided on an inner bottom plate of the bell shaped reactor;
   wherein for a set amount of time at an early stage of the reaction, ejecting raw gas from gas supplying ports adjacent to a center of the reactor is performed as follows:
   closing valves of selected gas supplying ports adjacent to the center of the reactor for a predetermined amount of time so as to stop ejection of raw gas from the selected gas supplying ports while ejecting raw gas from all other gas supplying ports and after the predetermined amount of time opening the valves of the selected gas supplying ports, and
   closing valves of newly selected gas supplying ports adjacent to the center of the reactor for another predetermined amount of time while ejecting raw gas from all other gas supplying ports and after the another predetermined amount of time opening the newly selected gas supplying ports, and repeating.

2. The polycrystalline silicon manufacturing method according to claim 1, wherein for a set amount of time at the early stage of the reaction, ejecting raw gas from gas supplying ports adjacent to a center of the reactor is performed by the method further comprising:
   providing the gas supplying ports concentrically arranged from the center of the bell shaped reactor;
   closing valves of the selected gas supplying ports corresponding to 5 to 15% of the total number of the gas supplying ports from among the gas supplying ports placed on a most inner circumference and a second circumference from the most inner circumference to stop ejecting the raw gas from the selected gas supplying ports for a predetermined amount of time and after a predetermined amount of time opening the valves of the selected gas supplying ports; and
   closing a same number of valves as previously closed of newly selected gas supplying ports, placed on the most inner circumference and the second circumference from the most inner circumference to stop ejecting the raw gas from the newly selected gas supplying ports for a predetermined amount of time and after a predetermined amount of time opening the newly selected gas supplying ports, and repeating.

3. The polycrystalline silicon manufacturing method according to claim 1, further comprising providing gas supplying ports arranged concentrically from the center of the bell shaped reactor.

4. The polycrystalline silicon manufacturing method according to claim 3, wherein the gas supplying ports are concentrically disposed across approximately a whole area covering the inner bottom of the bell shaped reactor, while leaving intervals between the ports so that raw gas can be uniformly supplied.

5. The polycrystalline silicon manufacturing method according to claim 3, wherein the gas supplying ports to be closed are selected so that both of two adjacent gas supplying ports on a same circumference are not closed.

6. The polycrystalline silicon manufacturing method according to claim 1, whereby an interference between upward gas flow and downward exhaust gas flow can be prevented.

7. The polycrystalline silicon manufacturing method according to claim 2, wherein the predetermined amount of time is not less than 10 minutes and not more than 60 minutes.

8. The polycrystalline silicon manufacturing method according to claim 2, wherein the predetermined amount of time is 20 minutes.

9. The polycrystalline silicon manufacturing method according to claim 1, further comprising after the set amount of time at the early stage of the reaction, terminating the closing of the valves of the gas supplying ports, and growing the polycrystalline silicon by ejecting raw material gas from the gas supplying ports.

10. The polycrystalline silicon manufacturing method according to claim 1, wherein a standard for determining an end of the set amount of time at an early operating stage is a time at which the polycrystalline silicon is deposited to substantially an opposite angle length which is two to three times an opposite angle length D in a transverse section of the silicon seed rod having a rectangular shape on the transverse section, when the transverse section of the silicon seed rod is formed in the shape of a rectangle.

11. The polycrystalline silicon manufacturing method according to claim 1, wherein closing the valves of the gas supplying ports ejecting the raw gas is performed on about 11% of all valves of the gas supplying ports.

12. The polycrystalline silicon manufacturing method according to claim 2, wherein the gas supplying ports may be provided in three or more concentric circles.

13. A polycrystalline silicon manufacturing method, in which a plurality of gas supplying ports for ejecting raw gas upward in a bell shaped reactor and gas exhausting ports for exhausting exhaust gas after a reaction are provided on an inner bottom plate of the bell shaped reactor in which a plurality of silicon seed rods are stood, the silicon seed rods are heated and polycrystalline silicon is deposited from the raw gas on surfaces of the silicon seed rods, the method comprising:

selecting 5 to 15% of a total number of the gas supplying ports from among the gas supplying ports placed on a most inner circumference and a second circumference from the most inner circumference to control valves of gas distributing tubes connected to the gas supplying ports;

controlling the selected gas supplying ports, with a valve controlling device, to close for a predetermined amount of time at an early stage of the reaction so as to stop ejection of raw gas from the selected gas supplying ports arranged adjacent to a center of the bottom plate while ejecting raw gas from nonselected gas supplying ports; and repeating the above steps.

* * * * *